United States Patent [19]

Rameau

[11] 4,096,211
[45] Jun. 20, 1978

[54] VARIABLE FLOW ELASTIC NOZZLE

[75] Inventor: Jean Rameau, Sannois, France

[73] Assignee: Regie Nationale des Usines Renault, Boulogne-Billancourt, France

[21] Appl. No.: 728,713

[22] Filed: Oct. 1, 1976

[30] Foreign Application Priority Data

Oct. 1, 1975   France .............................. 75 30041

[51] Int. Cl.² .............................................. F02M 9/10
[52] U.S. Cl. ...................... 261/23 A; 123/139 AW; 137/98; 137/114; 251/5; 261/62; 261/DIG. 56; 261/44 H
[58] Field of Search ........ 261/62, DIG. 56, DIG. 59, 261/DIG. 60, 23 A, 44 H; 251/5; 137/98, 111, 114; 123/139 AW

[56] References Cited

U.S. PATENT DOCUMENTS

| 2,769,397 | 11/1956 | Bolger ........................................ 251/5 |
| 2,964,285 | 12/1960 | Bardet ........................................ 251/5 |
| 3,570,824 | 3/1971 | Strohm et al. ............... 261/DIG. 56 |
| 3,756,209 | 9/1973 | Hida et al. ........................... 261/23 A |
| 3,768,787 | 10/1973 | Marsee ................................ 261/23 A |
| 3,882,882 | 5/1975 | Preisig ...................................... 137/98 |
| 3,903,211 | 9/1975 | Kono et al. ......................... 261/23 A |

FOREIGN PATENT DOCUMENTS

| 149,162 | 5/1937 | Austria ...................................... 251/5 |
| 986,047 | 3/1951 | France ....................................... 251/5 |
| 2,006,739 | 8/1971 | Germany ..................... 261/DIG. 56 |
| 653,429 | 4/1963 | Italy ............................................ 251/5 |
| 1,279,760 | 6/1972 | United Kingdom ..................... 251/5 |
| 210,521 | 1/1924 | United Kingdom ..................... 261/62 |

*Primary Examiner*—Tim R. Miles
*Attorney, Agent, or Firm*—Oblon, Fisher, Spivak, McClelland & Maier

[57] ABSTRACT

A variable-venturi nozzle for the measurement and regulation of flows in gas conduits, in particular in internal combustion engine intakes, wherein at least one wall element in the zone of the venturi throat thereof is in the form of at least one elastic wall deformable under the action of the pressure of a control fluid.

3 Claims, 6 Drawing Figures

VARIABLE FLOW ELASTIC NOZZLE

BACKGROUND OF THE INVENTION

1. Field of the Invention

The present invention relates generally to the field of fluid mechanics and more particularly to the measurement and regulatinon of flow in apparatus for preparing mixtures of fluids (liquid and/or gas), such as, for the preparation of a fuel mixture for combustion engines.

2. Description of the Prior Art

In devices having a throttling means, generally called a nozzle or venturi, changes in fluid flow entail a variation in flow velocity if the "throat" is fixed in cross section.

Devices with venturis of variable throat section used for flow regulation, notably in internal combustion engine carburetors, are known. They are generally formed mechanically with movable parts making up the walls of a venturi and controlled in position by the regulating means. Among their disadvantages are the poor aerodynamics of the flow channel, leading to losses in pressure and parasitic turbulence, and their low sensitivity and fidelity in response to the factors of regulation, due to their mechanical nature.

SUMMARY OF THE INVENTION

The goal of the present invention is to remedy these defects and to modify the flow velocity at will by varying the circular section of the throat by the external action of the pressure, or by the underpressure, of a control fluid, without the friction and the inertia response in the known mechanical systems, particularly in the regulation of carburetors with a variable venturi.

According to the invention, a nozzle with a variable section venturi is characterized by the fact that at least one wall element in the zone of the throat of the venturi is constituted by at least one elastic wall which is deformable under the action of the pressure of a control fluid.

The invention is applicable to numerous devices, improving or modifying their characteristics, such as, flowmeters, mixers, flow regulators, and the like. The wall element in the zone of the venturi throat is constituted by at least one elastic, deformable wall which encloses a space subjected to the control pressure which deforms the wall into a shape equalizing the static pressure of the control fluid and the dynamic pressure of the regulated fluid flowing through the venturi.

The elastic wall can consist of an elastic sleeve which internally forms a passage for the fluid stream to be regulated and encloses a circular space where the pressure of the control fluid is exerted. It can likewise consist of an elastic bulb situated on the axis of the passage for the fluid being cotrolled, the interior of the bulb being subjected to the pressure of the control fluid.

The flow of a homogeneous fluid in a conduit is disturbed by variations in the cross-section thereof and by obstacles present in the section, the result being larger pressure losses as the divergence of the shape of the section from circular or from the ideal convergent-divergent development of a circular-section conduit becomes greater.

This preferential shape can be achieved by locally doubling the deformable wall with at least a second deformable enclosure subjected to the pressure of at least one control fluid.

The invention is particularly adaptable to a device for preparing the fuel mixture of a motor, significantly improving it. In this case, conditions are even more perturbed by pulsation of the flow and, from the throat on, by inhomogeneity of a fluid composed of more or less humid air and fuel. The fuel may be in the form of a gas, a vapor or of variable sized droplets.

This is why in certain types of carburetors called "constant vacuum" types, permitting variation of the "throat" section is detrimental to the conditions of flow, with consequent significant pressure loss, especially at low openings with an unfavorable effect on the motor's charging efficiency.

The ideal shape for a venturi with a variable throat section is, therefore, a surface of revolution deformable in a continuous but rapid and sensitive manner under the instantaneously varying conditions of operation of the carburetor. This deformable elastic shape can be realized using a synthetic material impervious to gas and resistant to liquid or gaseous hydrocarbons at the operating temperatures. Synthetic rubbers used in gaskets subjected to such conditions are particularly suitable.

In a standard carburetor, the flow of the mixture is controlled by the position of the butterfly valve, except for the "idle." Such a butterfly valve also plays an important role in the initial opening for passing from "idle" to "normal" speed.

It is a question, then, of an indispensable device in a single-barrel carburetor. According to a particular realization of the invention, it is possible to eliminate the butterfly valve of the second barrel in a two-barrel carburetor. In this case, the "venturi" variable by elastic deformation in accordance with the invention acts as the butterfly valve, the section of the throat being controlled either by the vaccuum or by a suitable linkage to the accelerator pedal, as a function of the parameters of the regulation of the power and the RPM of the motor.

According to the invention, a variable venturi arrangement can likewise be associated with an injection arrangement in an intake duct, with the characteristic of obtaining a more suitable air flow in the fuel injection zone to produce a perfectly homogeneous mixture. The duct has a variable-section elastic nozzle in the axis of which is situated a diffuser into which issues the jet of an injector snychronized in operation with the opening of the intake valve.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein.

DETAILED DESCRIPTION OF THE ILLUSTRATED EMBODIMENTS

Figure 1:
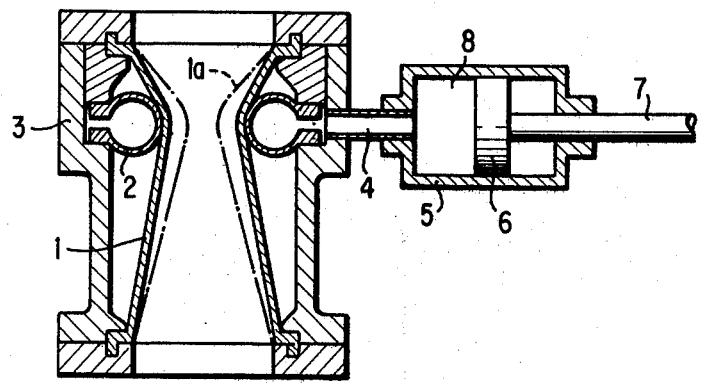
FIG. 1 is a diagram, partly in section, of a variable nozzle according to the present invention having a deformable annular element.

In the arrangement represented schematically in FIG. 1, the deformation of the nozzle 1, which in the relaxed position makes the section of the passage maximum, is obtained by the action of a toroidal chamber 2 connected by a conduit 4 to a device producing a variation of the volume in chamber 2, such as that shown, which comprises a cylinder 5 with a piston 6 being movably disposed therein by means of a rod 7 to vary the volume of a chamber 8 therein.

The toroidal chamber 2, conduit 4 and the portion 8 of cylinder 5 are filled with an incompressible fluid. The operation of this arrangement is as follows: pushing piston 6 to the left reduces the volume of the portion 8 of the cylinder and thus increases the pressure of the fluid which is transmitted to the annular chamber 2 to thereby increase its volume and press radially on the deformable nozzle 1, the section of which is thus reduced, as indicated by dotted line 1a. Suitable pre-stretching of the membrane of nozzle 1 permits contraction without wrinkling at the throat and supplementary extension in the convergent and divergent zones.

Thus, to every position of piston 6 corresponds a section of the throat of the "venturi" formed by the nozzle 1.

This shape remains stable and unperturbed by the flow, the pressure loss thus being low. The toroidal cushion 2 likewise assures the permanence in position of the throat and in the convergent-diver- gent shape of the venturi. This arragement may be referred to as an annular embodiment.

The combination of nozzle 1 and annular chamber 2 is installed in a housing 3 provided with assembly elements for mounting it in the fluid conduit in which the flow or flow velocity is to be controlled.

Figure 2:
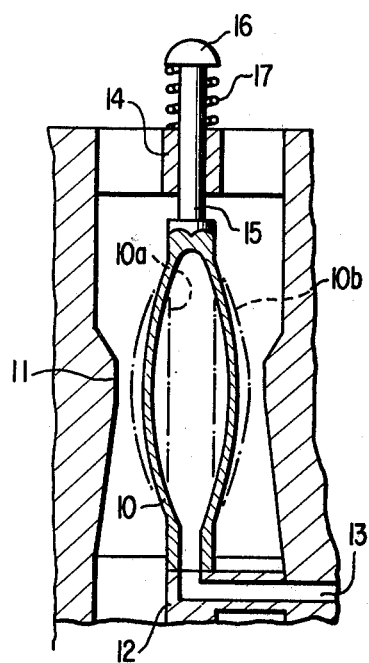
FIG. 2 is a section view of a variable nozzle with a deformable control spindle-shaped element.

In the arrangement shown schematically in FIG. 2, a central deformable element in the form of a bulb or spindle 10 is on the axis of a rigid venturi 11 of standard shape. It is held in this position, at the lower end, by a centering element 12, incorporating a conduit 12 for providing the connection to an external control element, not shown. This centering element 12 is perforated to allow passage of the fluid with minimum pressure loss. An upper guide element 14 holds the rod 15 integral with the spindle 10, and a spring 17 pressing downward on the guide element 14 and upward against a cap 16 screwed onto rod 15 exerts a traction force on the spindle 10.

According to the invention, variation of the section of the passage between the venturi and the spindle 10 by deformation of the spindle can be achieved in different ways, as (a) by means of a pressurized fluid entering through line 13, as in the case depicted in FIG. 1;

(b) by means of pneumatic suction, as will be described below in connection with FIG. 6; and (c) by axial mechanical action, traction or compression. The wall thickness and elasticity of the deformable piece will obviously depend on the shape and the chosen control means.

The operation of the configuration of FIG. 2 will now be described.

When relaxed, the central element 10 is practically cylindrical, as indicated by dash lines 10a, and is held stretched by the action of spring 17. If one introduces a fluid into the interior of the central element 10 through line 13 and raises the pressure of this fluid, the central element 10 "swells," shortens slightly and reduces the annular section between itself and the venturi 11, as indicated by dash lines 10b, up to complete closure if desired. This type of embodiment may be referred to as a spindle-type. The complete assembly can be installed in a housing, not shown, furnished with means for mounting it on the fluid conduit for the purpose, for example, of controlling the flow from no flow up to the maximum flow fixed by the dimensions of the device.

Figure 3:
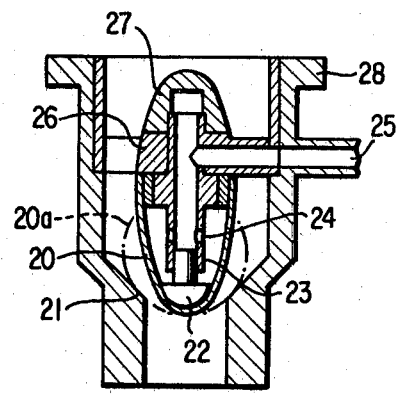
FIG. 3 shows a variable nozzle with a deformable central ogival element.

In a varient of the embodiment, schematically shown in FIG. 3 is a deformable central element in the form of an ogive or bulb 20, coaxial with a conical seat 21, which provides a variable section of passage for fluid flowing from top to bottom.

A plunger 22 guided in a sleeve 23 supports the tip of the ogive 20. This sleeve 23 receives the ogive 20 which screws onto its base, itself being centered in an element 26 perforated for the passage of the fluid and having a channel communicating with a conduit 25 in a housing 28.

The operation of the arrangement shown in FIG. 3 is as follows. In the relaxed position, the central element has the inital shape of an ogive and provides an annular passage of maximum section for the fluid. If a fluid is introduced into the interior of the ogive through conduit 25, the channel in element 26 and the central hole of sleeve 23 which opens into the ogive through the holes 24, and if the pressure of the fluid is raised by any suitable means, the ogive deforms into a "bulb" shape, as indicated by the dash lines 20a, for example. The result is a reduction in the section passing the controlled fluid and even complete closure of the device when the ogive 20 contacts the seat 21. This type of realization may be referred to as an ogive type.

Figure 4:
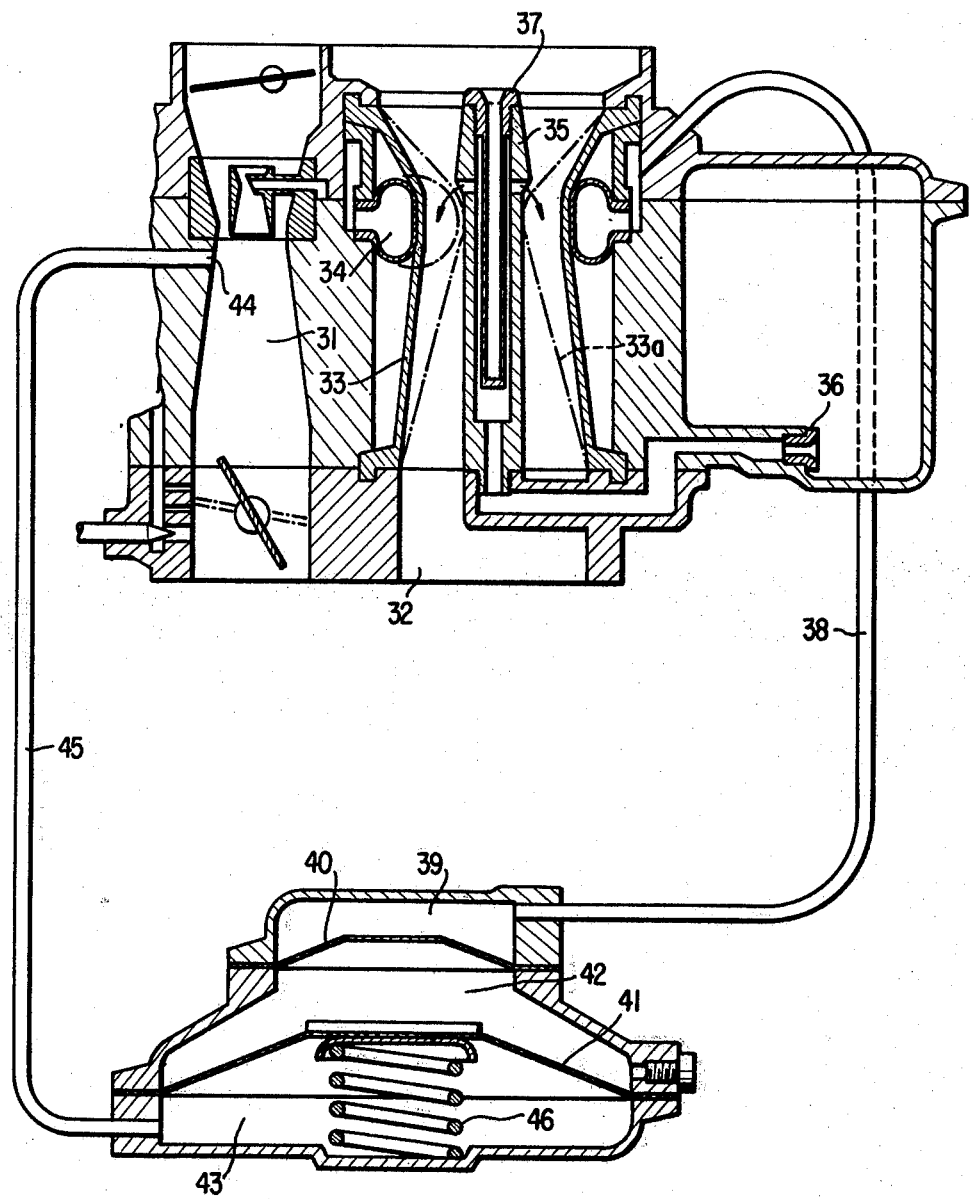
FIG. 4 shows the application of a deformable annular element in a two-barrel carburetor.

The use of an annular arrangement, previously described, according to the invention, is, in the example of FIG. 4, in an inverted two-barrel carburetor.

In this arrangement, the throat of the variable venturi has a conduit for introducing liquid or gaseous fuel, or an emulsion of air and fuel, being situated in the second barrel of an inverted two-barrel carburetor, the deformable venturi permitting variation of the annular section between itself and the fuel conduit.

The first barrel 31 is of standard design, but of smaller section than the second barrel 32, and is of a fixed-nozzle type, with all the usual means permitting cold starting or choke, idling and smooth advance from idle to low speed.

The second barrel 32 is dimensioned to charge the engine with the correct mixture up to maximum operating conditions. It has a variable nozzle 33 controlled by a toroidal chamber 34. Situated on the axis of this nozzle is a central, hollow, cylindrical element 35 having, for example, a known type of emulsifying means 37 feeding radial passages opening into the venturi just above the throat. This emulsifier 37 is fed fuel through a line from a constant-level reservoir by way of a submerged jet 36 of standard design.

Variation of the opening of the second barrel with the deformable nozzle can be effected in different ways which vary, by a suitable law, the pressure of the fluid in the toroidal chamber 34.

For instance, this control can be achieved in taking, as a reference value, the vacuum prevailing in the throat of the venturi of the first barrel by an orifice 44 and transmitting the vacuum to the lower chamber 43 of the control device through tube 45. This vacuum acts on a diaphragm 41 against the force of a spring 46, the other side of the diaphragm 41 closing off a volume 42 filled with a gas under pressure, the upper side of the volume 42 being closed off by a smaller diameter diaphragm 40, the other side of which acts on the fluid contained in a volume 39, a tube 38 and the toroidal chamber 34.

The operation of such an arrangement is as follows. With the motor stopped or idling, the vacuum in the first barrel 31 is zero, and the force of spring 46 is transmitted to the gas in volume 34, which gas pushes against diaphragm 39. The pressure of the fluid in the annular chamber 34 is maximum and the nozzle 33 is in contact with the central element 35.

When the butterfly valve of the first barrel begins to open, the vacuum is transmitted by orifice 44 to the control device for the variable nozzle of the second barrel. The pressure in the annular chamber 34 decreases and the variable nozzle dilates to make the section of the passage larger the stronger the vacuum. Correct operation can be obtained by suitable dimensioning of the different intervening stages in the regulation of the flow of the mixture as a function of the vacuum prevailing in the first barrel, which vacuum depends on the position of the butterfly valve, the motor speed and the total section for the flow in the nozzles of the two barrels.

The operation of the second barrel controlled by the vacuum is sufficiently familiar to be unnecessary to describe.

Figure 5:
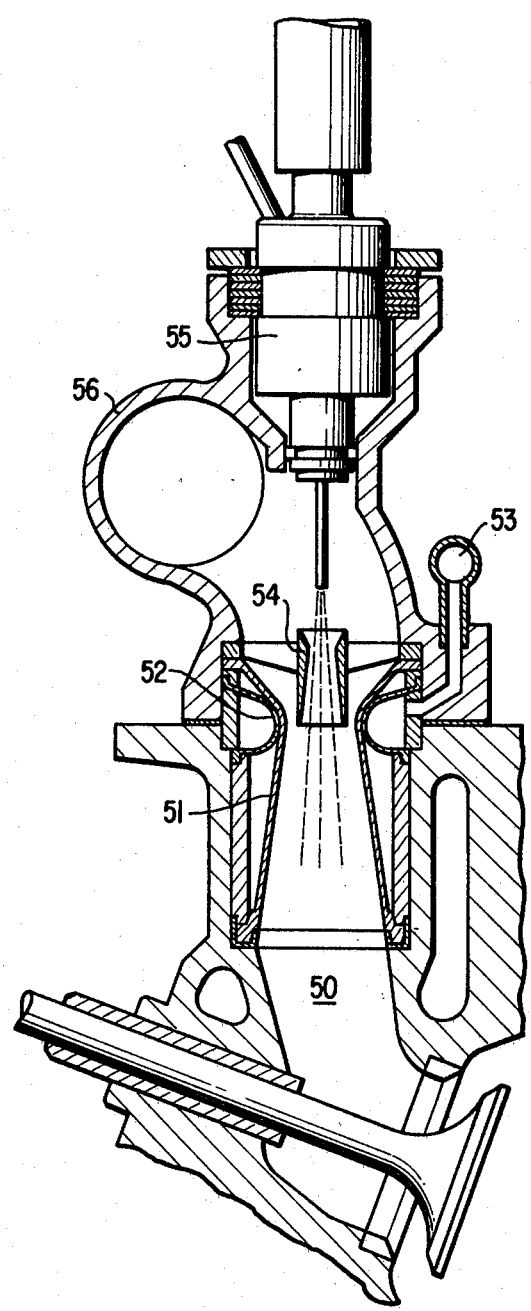
FIG. 5 shows the application of a deformable annular element in an intake duct with injection.

The use of an annular configuration of the invention is also shown in FIG. 5 for an intake of a combustion engine in conjunction with a low-pressure injection system, mechanical or electronic, with the aim of constantly suiting the velocity of air flow to the quantity of fuel furnished by the injector. The intake duct has a variable section nozzle on the axis of which is located a diffuser into which opens the jet of an injector, the functioning of which is synchronized with the opening of the intake valve.

In FIG. 5, in the intake conduit 50 of cylinder, there is located an assembly comprising an annular type variable nozzle 51 with its annular chamber 52 where a fluid under variable pressure is introduced by way of a passage 53 common to all the cylinders of the engine. The arrangement for pressurizing passage 53 and the annular chambers 52 is controlled in parallel with the injection system by any appropriate means.

Upstream of the variable nozzle 51 and concentric therewith is located a diffuser 54 into which opens the fuel jet of an injector 55 mounted in the manifold 56 which has a means of controlling the air flow, for example, a butterfly valve, not shown in the figure.

The operation of the arrangement is as follows. At low fuel inputs, as in idling and low speeds, the section of the nozzle is kept small in order to obtain optimum flow velocity at the throat which favors formation of a homogeneous mixture. When the fuel input increases with the load, the nozzle section is enlarged proportionally by the contraction or expansion of the annular volume 52, evacuated by the control fluid through tube 53 under the action of a regulating vacuum, as indicated above.

Figure 6:
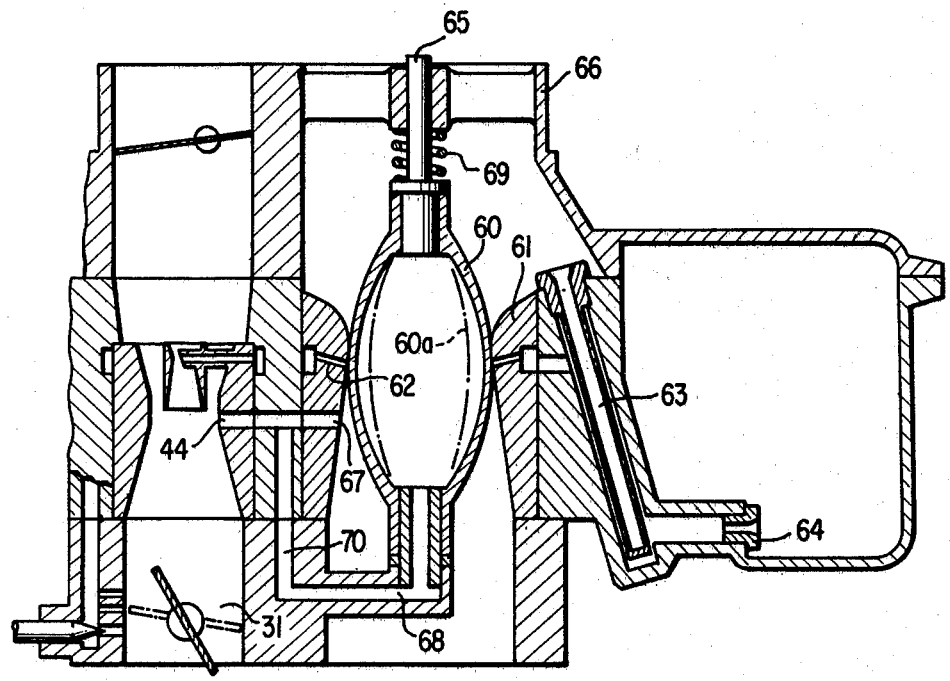
FIG. 6 shows the application of a deformable central spindle-shaped element in a two-barrel carburetor.

A spindle type arrangement of the invention is shown in FIG. 6, being used with a two-barrel carburetor, but in this case it is the vacuum which is used to obtain a deformation in contrast to the arrangement of FIG. 2 where it is a pressure which produces the deformation.

In FIG. 6, the standard-design first barrel 31 has, as in the case of FIG. 4, a fixed nozzle and the usual devices for operating at idle. The second barrel has a central deformable element 60 of the spindle type, the initial relaxed shape of which is such that its most extended part bears on the throat of venturi 61 and assures the closure of the second barrel. The venturi 61 has, on a circumference situated at the level of the throat, several radial holes 62 opening into an annular passage fed with fuel by an emulsifying system 63 and a jet 64 at the outlet of a standard design, constant-level reservoir.

The central element 60 is mounted on a hollow support bracket 68 obstructing gas flow as little as possible, and is held at the top by a rod 65 which slides in a guide attached to housing 66. A spring 69 pushes on the central element and helps to maintain its spindle shape.

The operation of the second barrel, realized in conformity with the invention, is as follows. The vacuum at the throat of the venturi of the first barrel produced when the butterfly valve opens is transmitted by the orifice 44 to the passage 70 leading to the interior of the central element 60 and causes a reduction of the section of the latter, giving the profile indicated by dashed lines 60a, for example, resulting first in the opening of the second barrel and then in enlargement of the section of the venturi and a proportional supply of fuel through the holes 62. Correct operating conditions can be obtained by acting on the elasticity of the central element 60 and the stiffness of spring 69.

It is also possible to interpose between the vacuum sensing holes 44 and 67 and the interior of the central element 60 a modulating arrangement servoed to such external variables as temperature, barometric pressure, and the like.

Likewise, the fixed section jet 64 can be replaced with one of variable section and/or variable flow, with a needle, for example, the arrangement being servoed to the air flow, the temperature, the barometric pressure, and the like.

The invention is not limited to the modes of realization described above which are more particularly concerned with the application to combustion engines. It can just as well be applied in other fields involving fluid flow, such as, for example, overpressure safety devices, attenuators of vibration phenomena, shock waves, and the like. This last application is inherent in the variable flow type of the nozzle of the invention where the elastic nature of the walls cause a damping of parasitic vibrators, notably pressure variations of acoustic origin characteristic of internal combustion engines.

Obviously, many other modifications and variations of the present invention are possible in light of these teachings. It is therefore to be understood that within the scope of the appended claims, the invention may be practiced otherwise than as specifically described herein.

What is claimed as new and desired to be secured by letters patent of the United States is:

1. A device for preparing a carburized mixture for an internal combustion engine comprising:
    means defining a venturi throat in a fluid conduit;
    at least one wall element in the zone of the throat of the venturi being constituted by at least one flexibly deformable chamber member under the action of pressure from a regulating fluid;
    said flexibly deformable chamber member being sheathed locally by at least one deformable nozzle member subjected to the pressure of at least one regulating fluid assuring local, controlled deformation of the nozzle member to be regulated wherein said venturi throat has an inlet duct for liquid or gaseous fuel, located in the body of a double downdraft carburetor, said carburetor including a first and second barrel member with said deformable nozzle member being disposed in said second barrel member so as to permit a variation in the annular section between the inlet duct and itself in response to a pressure condition in said first chamber and further comprising a hollow, cylindrical element disposed along the axis of said deformable nozzle member including radial passages for feeding said fuel into said venturi throat at a position located above said throat.

2. A device according to claim 1, wherein said deformable nozzle member is formed by a flexible sleeve, lined on a level with the venturi with said deformable chamber member comprising an essentially annular-shaped flexible element which surrounds said flexible sleeve and which is subjected by means of a hydropneumatic control to pressure at said venturi throat.

3. A device for preparing a carburized mixture according to claim 2, wherein said deformable chamber member is deformable by a vacuum existing in an intake line connected to a vacuum orifice disposed in said first barrel member, said deformation being controlled by means of a double-diaphragm triple capacity control device including a lower, middle, and upper chamber, with a first diaphragm disposed between said lower and middle chamber and a second diaphragm disposed between said middle and upper chambers, said control device being connected to said deformable chamber for controlling deformation of said deformable chamber member in response to said vacuum.

* * * * *